Feb. 10, 1959 H. E. HILL 2,873,317

CALL TRANSMITTER

Filed June 3, 1954 6 Sheets-Sheet 1

INVENTOR
H. E. HILL
BY
R. O. Covell
ATTORNEY

INVENTOR
H. E. HILL
BY
R. D. Covell
ATTORNEY

Feb. 10, 1959 H. E. HILL 2,873,317

CALL TRANSMITTER

Filed June 3, 1954 6 Sheets-Sheet 3

INVENTOR
H. E. HILL
BY
R. O. Covell
ATTORNEY

Feb. 10, 1959 H. E. HILL 2,873,317

CALL TRANSMITTER

Filed June 3, 1954 6 Sheets-Sheet 4

INVENTOR
H. E. HILL
BY
R. O. Covell
ATTORNEY

Feb. 10, 1959 H. E. HILL 2,873,317

CALL TRANSMITTER

Filed June 3, 1954 6 Sheets-Sheet 5

INVENTOR
H. E. HILL
BY
R. O. Covell
ATTORNEY

Feb. 10, 1959 H. E. HILL 2,873,317

CALL TRANSMITTER

Filed June 3, 1954 6 Sheets-Sheet 6

INVENTOR
H. E. HILL
BY R. O. Covell
ATTORNEY

United States Patent Office 2,873,317

Patented Feb. 10, 1959

2,873,317

CALL TRANSMITTER

Henry E. Hill, Livingston, N. J., assignor to Bell Telephone Laboratories, Incorporated, New York, N. Y., a corporation of New York Application June 3, 1954, Serial No. 434,156

15 Claims. (Cl. 179—90)

This invention relates to call transmitters and more particularly to call transmitters of the preset, repetitive signaling type for use in high speed signaling systems utilizing pulse position codes to convey desired selective information.

Objects of this invention are to provide a call transmitter for transmitting selective information in a pulse position code which is simple and reliable in operation, which decreases the time consumed in transmitting such information and which is economical to maintain.

Telephone switching systems have been proposed heretofore in which the designations or directory numbers of called subscribers are transmitted from a calling subscriber's subset to a central office or from an originating office to an intermediate or terminating office by coded signals. These coded signals for each digit or letter of the designation are sequentially transmitted as impulses arranged in a two-out-of-five pulse position code. The sequential transmission of the coded signals representing a complete called designation are cyclically repeated with a start signal and a synchronizing signal being transmitted at the beginning of each cycle until the complete designation has been received and properly registered. One such telephone switching system is disclosed in the copending application of William A. Malthaner and Henry E. Vaughan, Serial No. 158,218, filed on April 26, 1950, now Patent No. 2,778,878, granted January 22, 1957.

The present invention is an improved call transmitter for transmitting coded signals in a pulse position code.

A feature of this invention resides in the generation of coded signal impulses by coupling at controllable intervals of time, one circuit in which oscillations are maintained to another circuit, the coupling taking place through openings in a shielding placed between a pair of coils. This coupled energy is then rectified to produce coded direct-current pulses.

Another feature of this invention pertains to means for generating coded pulses in a two-out-of-five pulse position code by electromagnetic scanning, thus avoiding the use of mechanical pulsing contacts which are costly to maintain and slow in operation.

A further feature of this invention resides in the utilization of a transistor oscillator circuit, the oscillations of which are induced at preset controllable intervals of time into a resonant circuit to produce impulses in a two-out-of-five pulse position code.

Another feature of the present invention resides in the means whereby a call transmitter can be preset to transmit a desired code by the operation of keys or levers which mechanically control the setting of a pattern of windows or openings in a conducting shield interposed between two coils between which magnetic coupling exists.

A still further feature of this invention pertains to means rendered operative by the removal of the telephone from its normal support for controlling the generation of a preset two-out-of-five pulse position code.

Another feature of the present invention resides in the use of a rotating coupling transformer to couple a circuit mounted on a rotating shaft to a stationary circuit thereby obviating the necessity for slip rings or similar devices.

Another feature of the present invention involves the utilization of unilateral conducting devices in a call transmitter to isolate the talking circuit from the code signaling circuit during the code signaling interval and to isolate the code signaling circuit from the talking circuit during the talking interval thereby eliminating the necessity for mechanical contacts which normally perform these functions.

These and other features of the invention will be fully apprehended from the following description of one embodiment thereof taken in connection with the appended drawings. This embodiment of the present invention comprises a telephone call transmitter which is arranged to transmit coded pulses in the two-out-of-five pulse position code utilized, for example, in the above-identified Malthaner-Vaughan application. It is to be understood, however, that the present invention is not limited in its application to the specific embodiment disclosed herein or to the generation of the particular two-out-of-five pulse position code described herein.

In the drawings:

Fig. 3 also shows the details for the shields utilized in the generation of a start signal and a synchronizing signal;

Fig. 5 also shows in simplified form the required receiving equipment at the central office;

Figure 5:
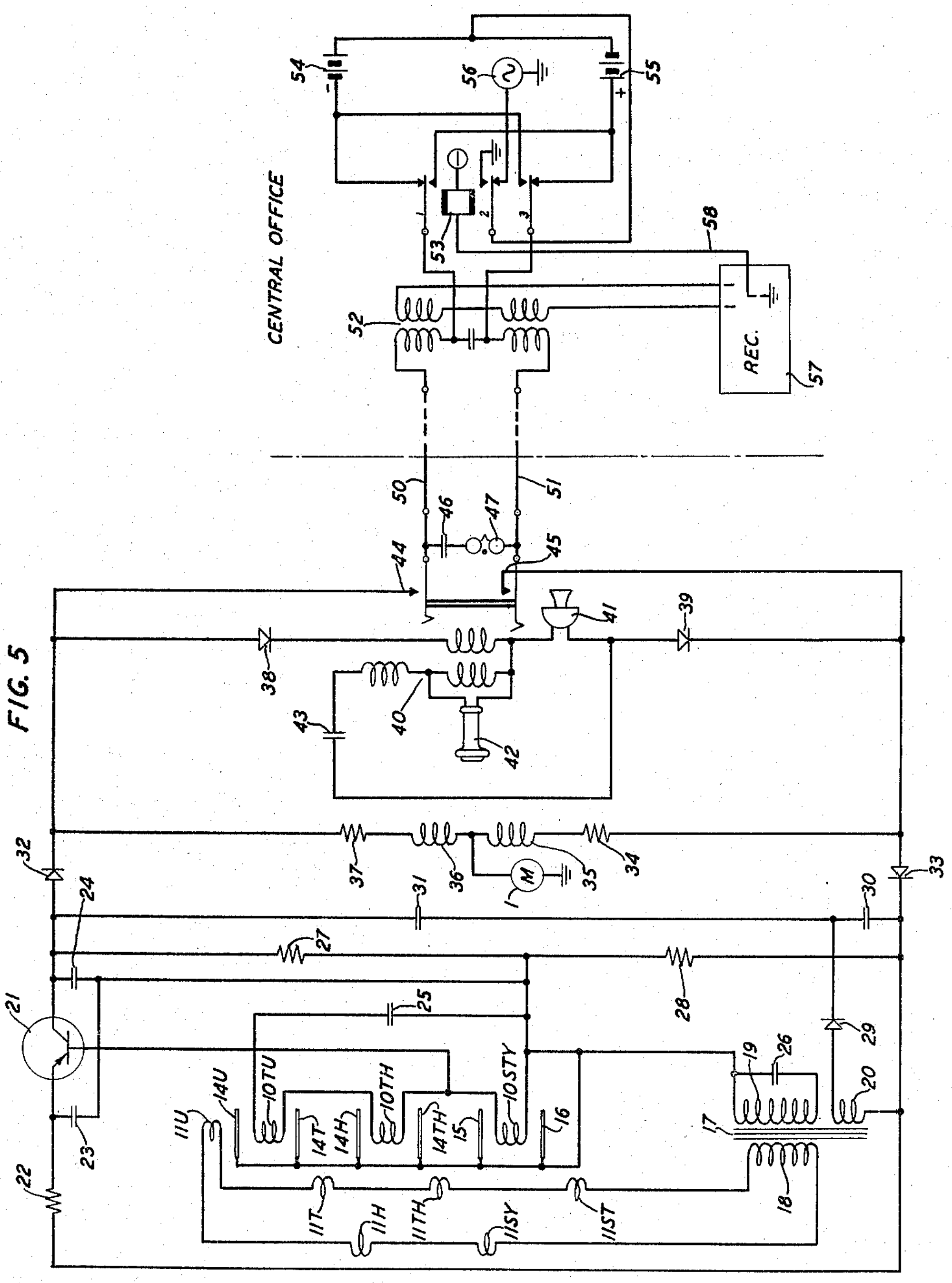
Fig. 5 shows in schematic form the electrical circuit for the call transmitter shown in exploded view in Fig. 4.
Figure 11:
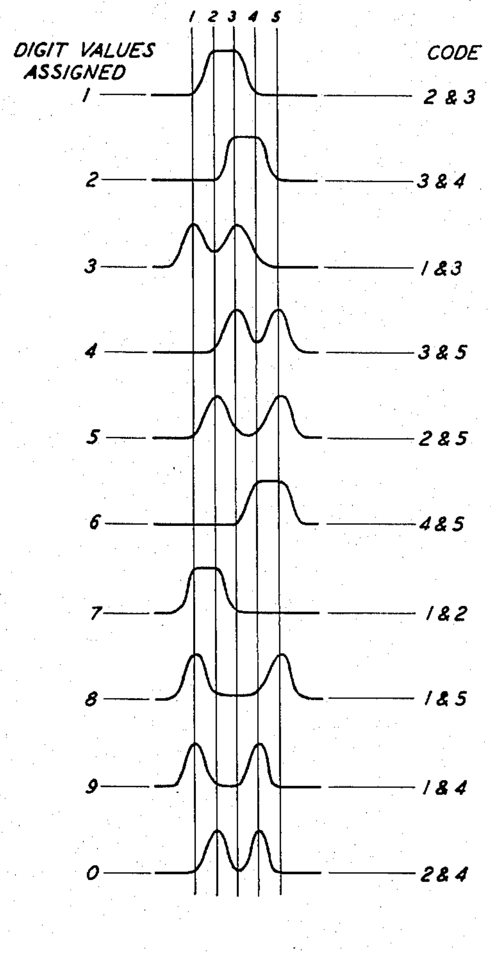
Figure 12:
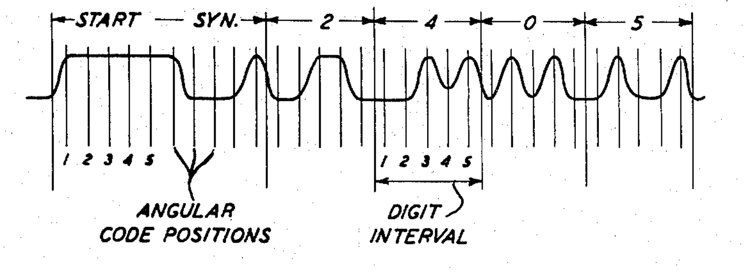

Fig. 11 is a graphic representation of the direct-current pulses produced by the call transmitter shown in Fig. 5 when one sweeper coil scans one stationary coil with a windowed shield at each of the ten positions representing the ten digits within a number; and Fig. 12 is a graphic representation of the direct-current pulses produced by the call transmitter shown in Fig. 5 when the signal codes representing an exemplary call designation 2405 are transmitted.

Figure 1:
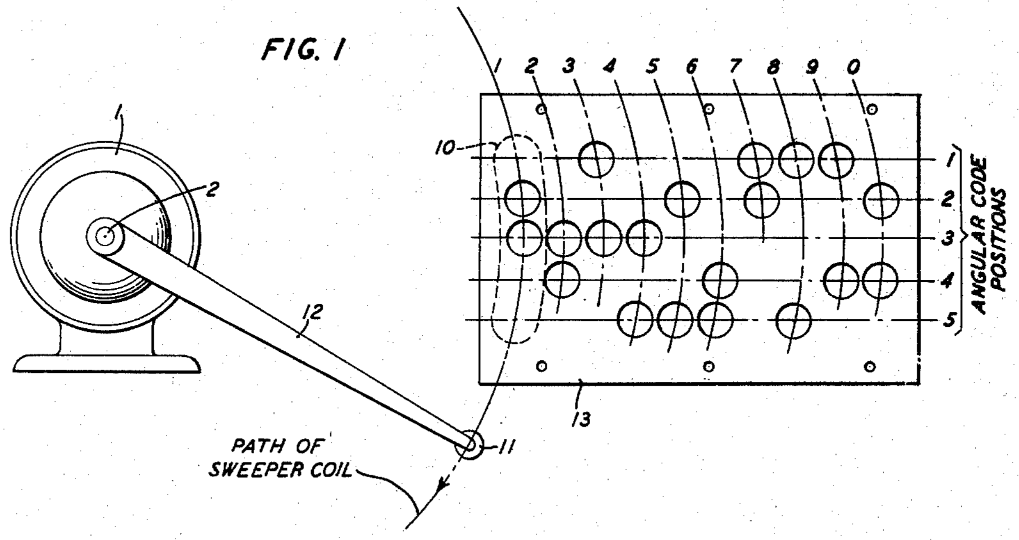
Fig. 1 shows in simplified form the manner in which coded signals for a single digit may be generated in a two-out-of-five pulse position code.
Figure 2:
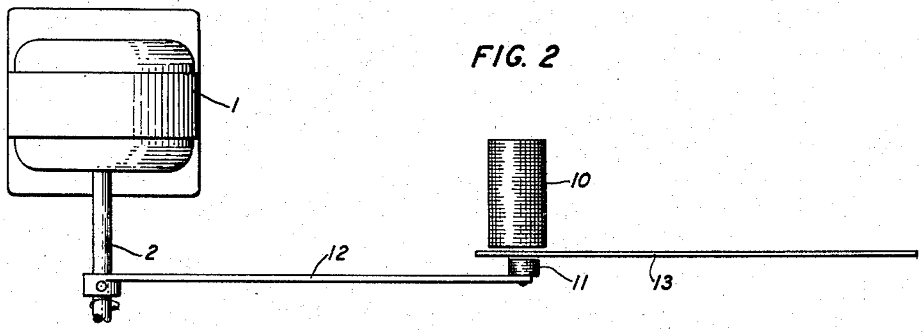
Fig. 2 is a top view of the equipment shown in Fig. 1.

The manner in which the call transmitter of the present invention generates code signals in a two-out-of-five pulse position code to represent a single digit of a called designation is shown in Figs. 1 and 2 of the drawings. A synchronous motor 1 rotates shaft 2 on which is mounted arm 12. At the outer end of arm 12 is mounted a small coil 11 of a few turns. As motor 1 rotates shaft 2, coil 11 is swept across the end of a stationary coil 10 in which oscillations are maintained. Interposed between stationary coil 10 and sweeper coil 11 is a shield 13 made of conducting material such as copper. Included in shield 13 are ten sets of perforations or windows, two perforations per set. These windows are arranged in shield 13 on a two-out-of-five position basis to represent the ten digits. Shield 13 may be shifted from right to left to any one of ten possible positions as shown so that any desired set of windows representing any desired digit may be placed between stationary coil 10 and sweeper coil 11. The windows through shield 13 are placed in such manner that in each of the ten positions of shield 13, coupling will exist between stationary coil 10 and sweeper coil 11 at two-out-of-five possible angular positions of sweeper coil 11 as it traverses the end of stationary coil 10. As shown in Fig. 1, the shield is interposed between the stationary coil 10 and sweeper coil 11 at the first position so that the windows in shield 13 occur at angular positions 2 and 3. Signals will be generated in sweeper coil 11 at two-out-of-five possible angular code positions of the sweeper coil 11 as it passes the end of stationary coil 10. These signals are generated by means of magnetic coupling between sweeper coil 11 and stationary coil 10 as sweeper coil 11 sweeps past the end of stationary coil 10.

The signals generated in sweeper coil 11 are used to identify the ten possible values of one digit within a number, the value of each digit being determined by the preset position of shield 13. For example, if shield 13 is preset between stationary coil 10 and sweeper coil 11 in the first position, which has been assigned to digit 1, signals will be generated at angular code positions 2 and 3. On the other hand, if shield 13 is moved to the left as shown in Fig. 1 to the fifth position, which is the position assigned to the digit 5, coupling will take place between stationary coil 10 and sweeper coil 11 at angular code positions 2 and 5 as sweeper coil 11 passes the end of stationary coil 10, and signals will be generated in sweeper coil 11 at the second and fifth angular code positions. It will be observed that the particular two-out-of-five code utilized in the generation of the pulse position code signals representing the various digital values is as follows:

| Digit values: | Angular code position of windows |
|---|---|
| 1 | 2–3 |
| 2 | 3–4 |
| 3 | 1–3 |
| 4 | 3–5 |
| 5 | 2–5 |
| 6 | 4–5 |
| 7 | 1–2 |
| 8 | 1–5 |
| 9 | 1–4 |
| 0 | 2–4 |

With the openings in shield 13 in the form of windows as shown in Fig. 1, the magnetic flux which links stationary coil 10 and sweeper coil 11 threads a short-circuited turn. In order to avoid this situation and to gain advantages in mechanization, the shield may be constructed as indicated by shield 14 in Fig. 3. In the selected two-out-of-five code there are four combinations of windows or openings having a central position hole or window. These are placed in sequence at the end of the shield closest to the shaft around which sweeper coil 11 rotates. These common windows can then provide a slot 3 which shaft 2 (which causes sweeper coil 11 to rotate) may occupy as the shield is shifted from the right to the left along a radial line passing through the location of the common central windows. The manner in which the shields are actually constructed is shown by shield 14 in Fig. 3. With this arrangement, the total distance through which shield 14 may be shifted can exceed the radius of sweeper arm 12 by a considerable factor, thus making it possible to have the overall dimensions of the device much smaller. It will be observed that the same pattern of openings between stationary coil 10 and the path swept by sweeper coil 11 is maintained in shield 14 and yet there are no short-circuited turns for the magnetic flux to thread.

In telephone switching systems of the repetitive signaling type which utilize two-out-of-five pulse position codes for transmission of the digital information, the codes representing a complete designation are sequentially transmitted and cyclically repeated until the complete designation has been received by the receiver. In this type of repetitive signaling system it is necessary to generate a start and synchronizing signal at the beginning of each cycle of the coded signals representing a designation. The start and synchronizing code signals may be generated in a manner similar to the generation of the digit code signals described above. By placing a shield such as shield 16, shown in Fig. 3, between a stationary coil and a sweeper coil, a start signal whose duration covers six angular code positions will be produced as the sweeper coil sweeps past the end of the stationary coil. Similarly, a successive synchronizing signal of one angular code position duration may be produced after a delay of three angular code positions by placing a shield such as shield 15, shown in Fig. 3, between a stationary coil and a sweeper coil with the synchronizing signal sweeper coil following the start signal sweeper coil in successive rotation by an angle equal to five angular code positions. Because the start signal code and synchronizing signal code do not change, shields 15 and 16 may be fixed in location and no provision need be provided for shifting these shields as in the case of the digit code shields. A telephone switching system of the type above described in which a start signal of six code positions is followed after a delay of three code positions by a synchronizing code of one code position duration which in turn is followed by digit code signals on a two-out-of-five basis is disclosed in the above-identified application of Malthaner and Vaughan.

The manner in which the above-described method of generating signal codes on a two-out-of-five pulse position basis and the above-described method of generating start and synchronizing signal codes may be utilized in a call transmitter of the preset repetitive signaling type is disclosed in Figs. 4 through 10 of the drawings. A suitable type of receiving equipment which is adaptable for responding to the start signal code, synchronizing signal code and to the coded pulses transmitted on a two-out-of-five pulse position basis from the call transmitter disclosed in Figs. 4 through 10 of the drawings is disclosed in the above-identified Malthaner-Vaughan application.

In the exemplary embodiment shown in Figs. 4 through 10 of the drawings, provision is made for the generation of coded pulses on a two-out-of-five pulse position basis representing four characters during each cycle of operation. These pulse position codes are repeatedly generated as long as oscillations are maintained in the stationary coils and the motor operates. In addition to the signal codes representing the four characters, a start signal code and a synchronizing signal code are also transmitted at the beginning of each cycle of operation. It will be understood that these characters may be digits or letters or a combination of the two as is commonly used in designating telephone calls. Each of the digits 0 to 9 will be represented by a combination of pulses in a two-out-of-five pulse position code. It is to be noted, however, that the exemplary embodiment is not limited to the generation of coded pulses for a four digit number and that coded pulses for any number of digits or characters (within reasonable limits) can be generated merely by increasing the number of stationary coils, sweeper coils and shields utilized in the device, as will be pointed out below. Furthermore, it is to be understood that the particular start signal code and synchronizing signal code generated by the exemplary call transmitter shown in Figs. 4 through 10 of the drawings are typical only and do not limit the scope of this invention. Other start and synchronizing signal codes can be generated by changing the size and shape of the shields 16 and 15, respectively.

Figure 3:
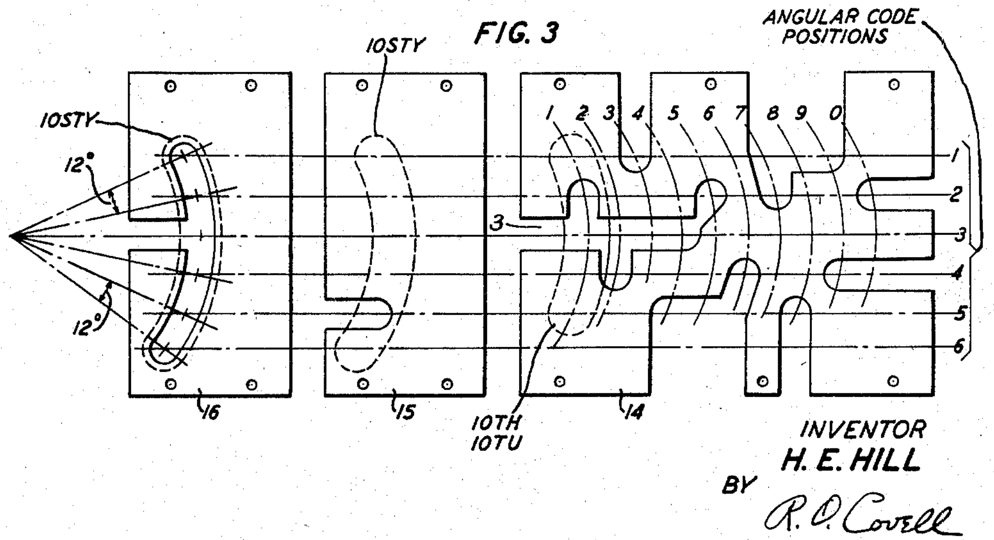
Fig. 3 shows the actual construction details of a digit code shield which is interposed between a rotating coil and a sweeper coil to generate coded signals in a two-out-of-five pulse position code in accordance with the present invention.
Figures 4, 10:
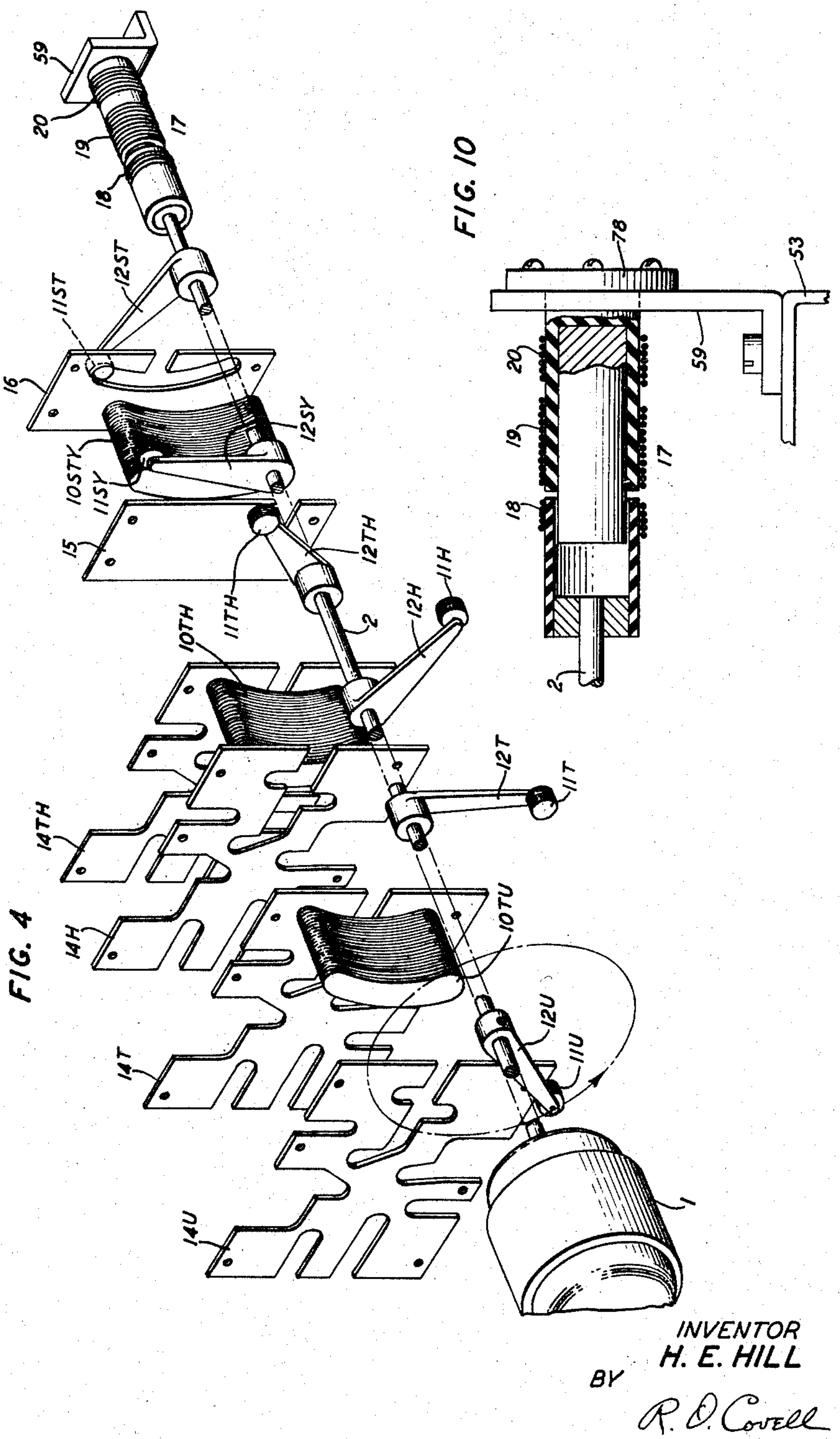
Fig. 4 is a simplified exploded view of a typical call transmitter which generates coded signals in a two-out-of-five pulse position code to represent digits or letters of a call designation and which also generates a start signal and a synchronizing signal.
Fig. 10 shows the details of the rotating coupling transformer utilized in the present invention.

Fig. 4 of the drawings is a simplified exploded view illustrating the manner in which a typical call transmitter incorporating certain of the objects and features of the present invention may be constructed. Other objects and features of the invention will be brought out in connection with Figs. 5 through 10 of the drawings. Fig. 4 shows a synchronous motor 1 which rotates a shaft 2 on which are mounted a plurality of arms designated 12ST, 12SY, 12TH, 12H, 12T and 12U. At the outer end of each of the arms is mounted a small sweeper coil of a few turns. For example, the sweeper coil mounted on arm 12ST is designated 11ST, the sweeper coil mounted on arm 12SY is designated 11SY and the sweeper coil mounted on arm 12U is designated 11U. These coils are the sweeper coils which will sweep past the end of associated stationary coils designated 10STY, 10TH and 10TU. Interposed between the path of each of the sweeper coils and its associated stationary coil is a shield of conducting material. The shield between sweeper coil 11ST and stationary coil 10STY is designated 16 and is shown in more detail in Fig. 3 of the drawings. As sweeper coil 11ST rotates past the end of stationary coil 10STY nearest arm 12ST, magnetic coupling will take place between sweeper coil 11ST and stationary coil 10STY through the window in shield 16. Shield 16, sweeper coil 11ST and stationary coil 10STY are utilized to generate a start signal. The shield interposed between the path of sweeper coil 11SY and stationary coil 10STY is designated 15 and is shown in more detail in Fig. 3. As sweeper coil 11SY rotates past the end of stationary coil 10STY nearest arm 12SY, magnetic coupling will take place between sweeper coil 11SY and stationary coil 10STY through the window in shield 15. Shield 15, sweeper coil 11SY and stationary coil 10STY are utilized to generate a synchronizing signal. Shield 14TH is interposed between sweeper coil 11TH and the end of stationary coil 10TH nearest arm 12TH. Similarly, shield 14H is interposed between sweeper coil 11H and the end of stationary coil 10TH nearest arm 12H. Likewise, shield 14T is interposed between sweeper coil 11T and the end of stationary coil 10TU nearest arm 12T and shield 14U is interposed between sweeper coil 11U and the end of stationary coil 10TU nearest arm 12U. As sweeper coils 11TH, 11H, 11T and 11U rotate past the respective ends of their respective stationary coils 10TH and 10TU, magnetic coupling will take place through the pattern of windows in shields 14TH, 14H, 14T and 14U, respectively, to generate coded signals, in the manner described above, in a two-out-of-five pulse position code to represent, respectively, the thousands, hundreds, tens and units digits of a telephone designation.

As indicated above, the exemplary embodiment of the call transmitter disclosed in Fig. 4 is arranged to transmit a complete designation comprising four digits and a start and synchronizing signal each revolution of shaft 2 and motor 1. With the combined start signal and synchronizing signal occuping two digit intervals, a total of six digit intervals must be covered in one revolution of shaft 2 to transmit the pulse position codes for a four digit member designation. With six digit intervals in each 360 degrees of rotation of shaft 2, the angle between the successive sweeper arms mounted along the length of shaft 2 must be 60 degrees. With five angular code positions within each 60-degree digit interval, the angle between the possible window locations in the shields is 12 degrees. In other words, the angular code positions are 12 degrees apart.

As mentioned above, a typical start signal such as utilized in the above-cited Malthaner-Vaughan application is a signal which has a duration of six angular code positions. A typical method of producing such a signal in accordance with the present invention is to make the window in shield 16 cover six angular code positions or 72 degrees as is shown in shield 16 in Figs. 3 and 4. At the same time it is also necessary to make the stationary coil 10STY, which is swept by sweeper coil 11ST to produce the start signal, larger in order to permit magnetic coupling between sweeper coil 11ST and stationary coil 10STY for six full angular code positions. Coil 10STY, which is utilized to produce the start signal, is shown in dotted outline on shield 16 in Fig. 3. A typical method of producing a synchronizing signal such as utilized in the above-cited Malthaner-Vaughan application is to place the window in shield 15 at angular code position 5 as shown in Fig. 3. Stationary coil 10STY, which is utilized to produce both the start signal and the synchronizing signal, is also shown in dotted outline on shield 15 in Fig. 3.

With arm 12SY separated by an angle of 60 degrees from arm 12ST, coupling will exist between stationary coil 10STY and sweeper coil 11ST during the first 72 degrees of rotation of shaft 2 or, in other words, during the first six angular code positions, assuming that the shaft 2 starts a clockwise rotation from a position where coil 11ST is located at the first angular code position on shield 16. During the next 36 degrees of rotation of shaft 2 or the next three angular code positions, no coupling will exist between stationary coil 10STY and sweeper coils 11ST or 11SY. Following this, coupling will exist between stationary coil 10STY and sweeper coil 11SY during the next 12 degrees of rotation of shaft 2 (that is, during the next angular code position). In other words, during the first 120 degrees of rotation of shaft 2 or during the first two digit intervals, coupling will take place between stationary coil 10STY and sweeper coils 11ST and 11SY, respectively, which will cause the production in the manner described in detail hereinafter of a start signal of six angular code positions in duration followed by a synchronizing signal of one angular code position in duration after a delay of three angular code positions. During the next 60 degrees of rotation of shaft 2 which covers the third digit interval, coil 11TH will sweep past the end of stationary coil 10TH and magnetic coupling will take place between stationary coil 10TH and sweeper coil 11TH at two-out-of-five angular code positions. The particular two of the five angular code positions at which coupling will take place will depend upon the positioning of shield 14TH. In like manner, during the remaining 180 degrees of rotation of shaft 2 which covers the fourth, fifth and sixth digit intervals, sweeper coils 11H, 11T and 11U will successively sweep past stationary coils 10TH and 10TU and magnetic coupling will exist between each of these sweeper coils and its associated stationary coil at two-out-of-five angular code positions depending upon the positioning of shields 14H, 14T and 14U, respectively.

Shields 14TH, 14H, 14T and 14U are identical in every respect with shield 14 shown in Fig. 3. Stationary coils 10TH and 10TU which are associated with these digit code shields are shown in dotted outline on shield 14 in Fig. 3. It will be observed in Figs. 3 and 4 that coil 10STY is larger than coils 10TH and 10TU to permit magnetic coupling for the six angular code positions required for the start signal. Shield 16 and shield 15, which are used in the generation of the start and synchronizing signals, respectively, are not adjustable as the start and synchronizing signals remain constant regardless of the values of the digits to be transmitted. Shields 14TH, 14H, 14T and 14U are, however, adjustable to any one of ten possible positions corresponding to the ten values of a digit within a number.

If it is desired to transmit a complete designation having more than four digits, for example, six, eight or ten, the number of sweeper coils, stationary coils and shields required will be increased accordingly. The digit signal sweeper coils as well as the start signal and synchronizing signal sweeper coils will be mounted on the shaft in a similar manner except that the angle by which they are separated will be decreased accordingly. For example, with a number consisting of eight digits or letters and a start and synchronizing signal corresponding to two digits, the angle between successive sweeper arms mounted along the shaft must be 36 degrees, thus making a digit interval equal to 36 degrees. With five possible angular code positions within each 36-degree digit interval, the angular code positions must be 7.2 degrees apart and the shields must be perforated accordingly.

All of the stationary coils are connected in series to a source of alternating current. This source, as will be described later, may be a transistor oscillator. Oscillations are maintained in the stationary coil circuits so that an alternating-current voltage will be magnetically induced in the sweeper coils through the windows or openings in their associated shields as each passes its associated stationary coil. The sweeper coils are connected in series with the rotating primary winding 18 of coupling transformer 17. The voltages induced in the sweeper coils are then applied to the rotating primary winding 18 of coupling transformer 17. These voltages are then induced in the stationary secondary winding 19 of coupling transformer 17 and then tapped from the stationary secondary winding 19 by a coupling coil 20 wound on the same core as winding 19, as will be described in detail hereinafter. The coupling transformer 17 mounted on shaft 2 is shown in greater detail in Fig. 10 of the drawings.

One of the advantages of the above-described method of producing coded pulses in a two-out-of-five pulse position basis is that one stationary coil may be scanned by two separate sweeper coils, thus decreasing the number of stationary coils required. Another advantage is that the coupling between the circuit mounted on the rotating shaft and the stationary circuit other than the scanned coils may be accomplished by means of the rotating coupling transformer thereby obviating the use of slip rings.

The electrical circuit for the exemplary embodiment of the call transmitter shown in the simplified exploded view of Fig. 4 is shown in Fig. 5 of the drawings. Stationary coils 10STY, 10TH and 10TU are the three stationary coils previously discussed in connection with Fig. 4 and are shown connected in series. This series combination of coils is shown connected in parallel with condenser 25, and this parallel inductance and capacitance combination constitutes a tapped resonant circuit which is connected in the base circuit of transistor 21.

Figure 6:
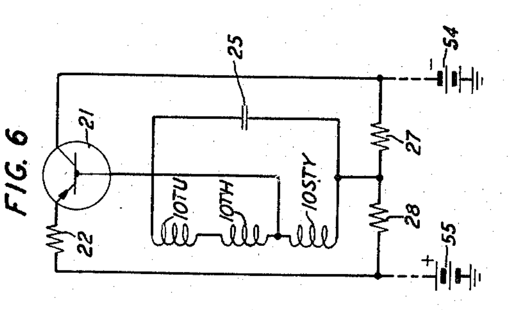
Fig. 6 is a simplified schematic of the basic transistor oscillator utilized in the call transmitter circuit of Fig. 5.

Transistor 21 is connected in a well-known transistor oscillator circuit which maintains oscillations in stationary coils 10STY, 10TH and 10TU. The frequency of these oscillations may be, for example, of the order of one megacycle per second. The basic transistor oscillator which is utilized in the exemplary embodiment of Fig. 5 is shown in Fig. 6 with the designation of the elements corresponding to those in Fig. 5. This transistor oscillator circuit is disclosed and described in the Bell System Technical Journal, volume 28, 1949, on page 394 and in the R. C. A. Review, volume 10, 1949, on page 14. It is to be understood that the present invention is not limited to the use of the particular transistor oscillator circuit shown in Figs. 5 and 6, but that other types of transistor oscillator circuits can be utilized. It is further understood that the circuit is not limited to the use of transistor oscillators and that a vacuum tube oscillator may also be utilized or, for that matter, any source of alternating current of suitable frequency.

The potentials required for operating the transistor oscillator circuit shown in Fig. 5 are supplied when switchhook contacts 44 and 45 close from sources 54 and 55 with polarity as shown, through back contacts and armatures 1 and 3 of relay 53, through the primary winding of repeating coil 52, over line conductors 50 and 51, through switchhook contacts 44 and 45, through varistors 32 and 33, to the voltage divider network comprising resistors 27 and 28. Varistors 32 and 33, being poled as shown in Fig. 5, offer a low impedance to the flow of current from line conductor 51 through resistors 28 and 27 to line conductor 50. At the same time, varistors 38 and 39, being poled as shown in Fig. 5, present a high impedance to this current flow and effectively isolate the talking circuit comprising transmitter 41, receiver 42, inductance coil 40 and condenser 43 from line conductors 50 and 51. By the proper selection of the magnitudes of resistors 27 and 28, the required operating potentials for transistor 21 may be obtained and oscillations will be maintained in stationary coils 10STY, 10TH and 10TU. These oscillations will continue as long as direct current of the indicated polarity is supplied from sources 54 and 55.

Condensers 23 and 24 connected, respectively, from the emitter and collector of transistor 21 to the common point of the oscillator circuit are provided to improve the wave form of the generated oscillations. Resistor 22, in the emitter circuit of transistor 21, controls the voltage between the emitter and base of transistor 21.

The sweeper coils described above with respect to Fig. 4 are shown schematically in Fig. 5. These are designated 11ST for generating the start signal, 11SY for generating the synchronizing signal, and 11TH, 11H, 11T and 11U for generating the thousands, hundreds, tens and units digits, respectively, of a called designation. These sweeper coils rotate past their associated stationary coils in the manner described hereinbefore. The sweeper coils are connected in series and in series with rotating primary winding 18 of coupling transformer 17. The stationary secondary winding 19 of coupling transformer 17 is connected in parallel with condenser 26 to form a second resonant circuit, coupling between the stationary coils through the windowed shields to this second resonant circuit being accomplished by the series circuit comprising the sweeper coils and rotating winding 18. The pulses of alternating-current energy magnetically induced in the sweeper coils through the windowed shields from the stationary coils is thus induced into the second resonant circuit comprising winding 19 and condenser 26. Oscillations in this resonant circuit are excited by the pulses of alternating-current energy received from the transistor oscillator through the sweeper coils. These oscillations are in turn tapped from the second resonant circuit by coupling coil 20 which is wound on the same core as stationary winding 19. These tapped oscillations are then rectified by rectifier 29, filtered by condenser 30 and applied to line conductors 51 and 50 through condenser 31 as direct-current pulses. Condenser 31 is relatively large as compared to condenser 30 so as to pass the direct-current pulses to the line conductors.

The shields which are interposed between the sweeper coils and the stationary coils are shown in Fig. 5 as shields 16, 15, 14TH, 14H, 14T and 14U. These are all electrically connected to the common point of the transistor oscillator to prevent the possibility of charges building up on the shields and causing spurious effects in the oscillator circuit.

Motor 1, as mentioned with reference to Fig. 4, rotates shaft 2 which causes the sweeper arms to sweep past their associated stationary coils. Motor 1 is connected as shown in Fig. 5 between ground and the common point of inductances 35 and 36 and is energized by an alternating-current voltage supplied over a simplex circuit from source 56. Resistors 34 and 37, connected in series with inductances 35 and 36, present a high impedance across line conductors 50 and 51 to the direct current which energizes transistor 21 and thus the motor and associated circuits have no appreciable shunting effect to the direct current which energizes transistor 21. Because motor 1 is connected in a balanced circuit across line conductors 50 and 51, direct current will not flow in motor 1. Inductances 35 and 36 in the bridging circuit offer practically no impedance to the flow of alternating current supplied over the simplex circuit which drives motor 1.

The impedance presented to the generated direct-current pulses by the bridging circuit across conductors 50 and 51 comprising resistors 34 and 37 and inductances 35 and 36 is high so as to permit these pulses to be transmitted over line conductors 50 and 51 to repeating coil 52 in the central office. Varistors 38 and 39, although poled in such a direction to pass these generated pulses, are prevented from doing so because they are biased to a high impedance by the direct-current voltage which energizes transistor 21.

Fig. 11 of the drawings is a graphic representation of the direct-current pulses applied to line conductors 50 and 51 obtained when one sweeper coil scans one stationary coil with a windowed shield at each of the ten positions representing the ten digits within a number.

Receiver 57, repeating coil 52 and relay 53, shown in Fig. 5, illustrate in simplified schematic form the type of receiving equipment which can be utilized to receive the pulses transmitted by the call transmitter of the present invention. Such equipment is described in detail in the above-cited Malthaner-Vaughan application. The generated pulses are transmitted over line conductors 50 and 51 and applied to repeating coil 52 in a central office where they are in turn detected and received by receiver 57. When receiver 57 has completed the detection and reception of a complete designation (in the exemplary embodiment, a four digit number), ground is applied by receiver 57 to conductor 58 which in turn causes the operation of relay 53. Relay 53, in operating, reverses the polarity of the potential applied to line conductors 50 and 51 and opens the circuit for the application of the alternating-current voltage from source 56 over the simplex circuit to motor 1. With the polarity of the potential applied to line conductors 50 and 51 reversed by the operation of relay 53, varistors 32 and 33 present a high impedance to the flow of current whereas varistors 38 and 39 present a low impedance. Therefore, the transistor oscillator will be deenergized and oscillations will cease and the talking circuits shown in Fig. 5 will be energized. When relay 53 operates and removes the source of alternating-current voltage supplied over the simplex circuit to motor 1, motor 1 is deenergized and ceases rotation.

The use of the varistors as above described, to isolate the talking circuit from the signaling circuit, eliminates the use of conventional contacts. Within the call transmitter, shown in Fig. 5, there are just two contacts, 44 and 45, which are required to disengage it from line conductors 50 and 51. This obviates one of the greatest sources of trouble in devices of this kind by eliminating contacts which frequently require attention and maintenance.

The ringer for the call transmitter is shown in Fig. 5 bridged across line conductors 50 and 51 in series with condenser 46. Upon receiving a call from a central office, ringing current and a direct current of the polarity required to energize the talking instruments of the device are applied to line conductors 50 and 51. In this manner, the ringer in the device will be operated and the transmitter-receiver energized. However, due to the action of the varistors described above, the transistor oscillator will not be energized.

The operation of the circuit of Fig. 5 will now be described for a typical call. Assume that the subscriber at whose station the device is located desires to initiate a call to a distant subscriber whose telephone designation is 2405. The subscriber will then preset the windowed shields by means which will be described later so that shield 14TH is in its second position which represents the thousands digit 2. He will preset shield 14H to the fourth position which represents the hundreds digit 4. Similarly, shield 14T will be preset to the tenth position representing the tens digit 0 and shield 14U will be preset to the fifth position representing the units digit 5. When the switch-hook contacts 44 and 45 are closed by the removal of the handset from its normal resting place, battery from sources 54 and 55 of polarity indicated is supplied to conductors 50 and 51. This, as described hereinbefore, will energize transistor 21 which will cause oscillations to be maintained in the stationary coils 10STY, 10TH and 10TU. When switchhook contacts 44 and 45 close, an alternating-current voltage from source 56 will also be supplied over a simplex circuit to motor 1 and motor 1 in turn rotates and drives the shaft on which are mounted the rotating sweeper coils. As the sweeper coils sweep past their respective stationary coils, coupling will, in the manner described hereinbefore, take place between the associated stationary and sweeper coils. The direct-current pulses applied to line conductors 50 and 51 for this specific example are shown in graphic representation in Fig. 12. As rotating coil 11ST sweeps past stationary coil 10STY, a start signal whose duration lasts for six angular code positions is generated and applied to the line. Following this, a synchronizing signal will be applied to the line when coil 11SY sweeps past stationary coil 10STY at its fifth angular code position. Thereafter, coded pulses in a two-out-of-five pulse position code representing the digits 2, 4, 0 and 5, respectively, are produced and applied to line conductors 50 and 51 as each of the coils 11TH, 11H, 11T and 11U sweep past its associated stationary coil. As soon as one complete revolution has been completed the entire cycle is repeated and this repetition will continue until receiver 57 has received and registered the complete four digit designation. When this takes place, the action above described for the reversal of polarity of the potential supplied to line conductors 50 and 51 takes place and the transistor oscillator and motor are deenergized and the talking instruments of the device are energized.

Figure 7:
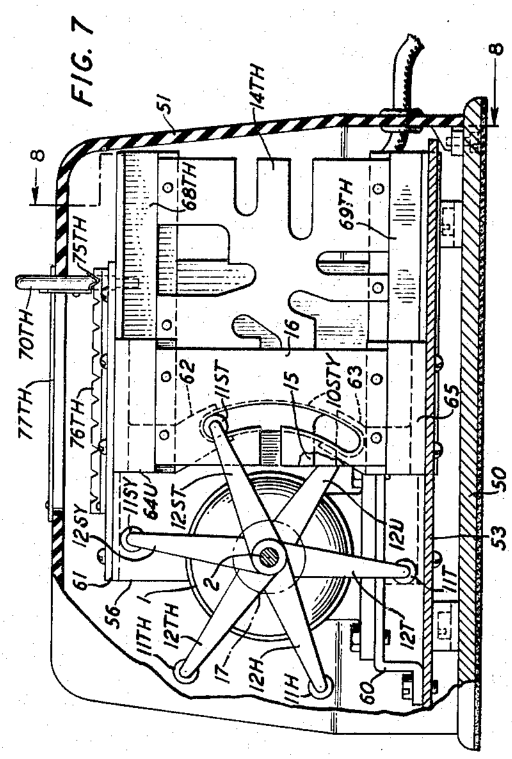
Fig. 7 is an end view taken along line 7—7 of Fig. 8 of a typical call transmitter constructed in accordance with the present invention and shows the motor, stationary and sweeper coils and the shields.
Figure 8:
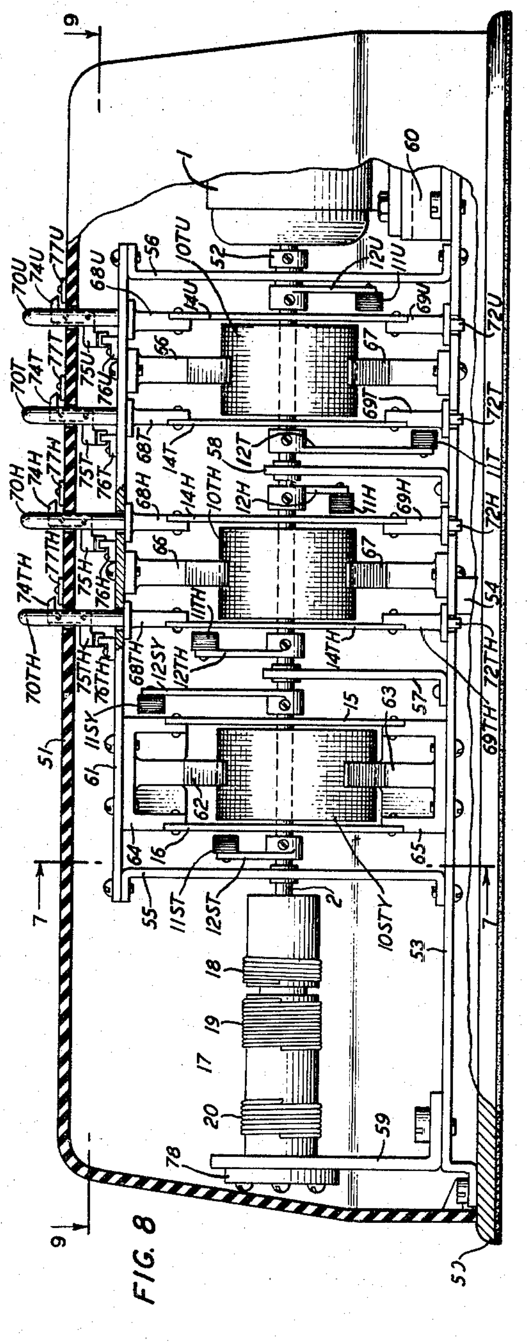
Fig. 8 is a side elevation taken along line 8—8 of Fig. 7.
Figure 9:
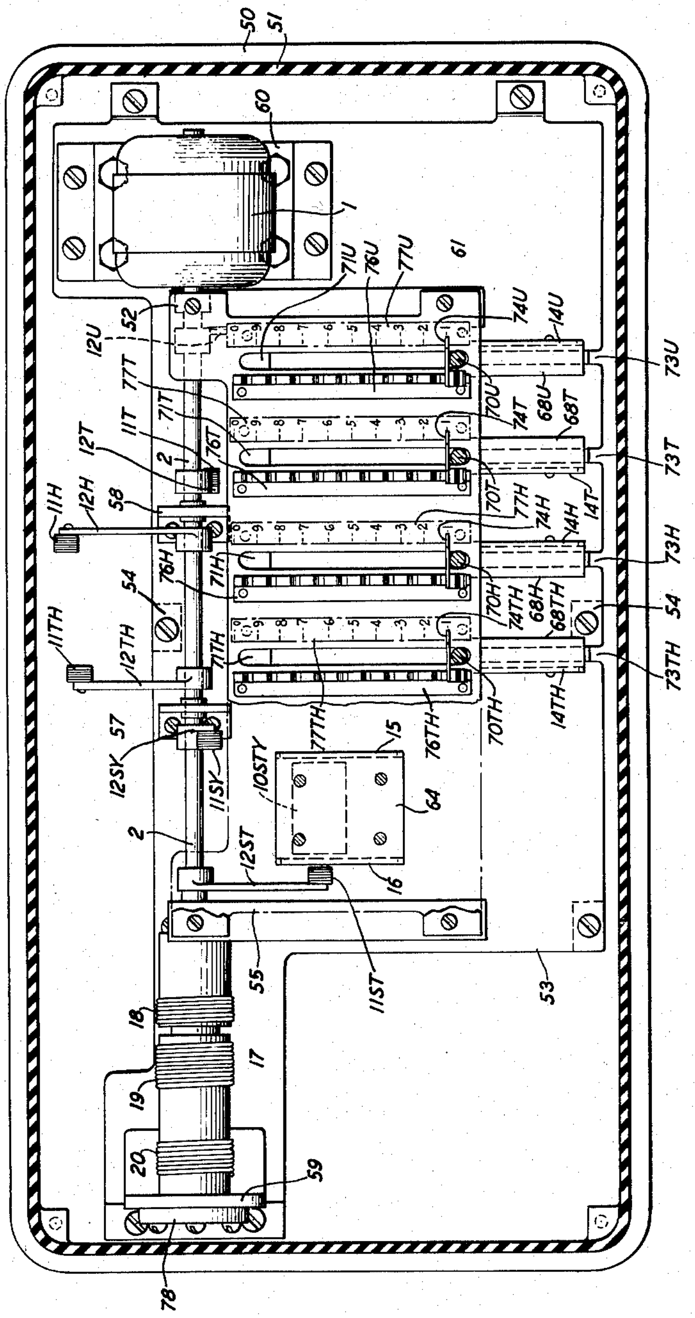
Fig. 9 is a top view taken along line 9—9 of Fig. 8 with a portion of the upper mounting plate broken away.

Figs. 7, 8 and 9 illustrate in a typical manner the mechanical structure of the exemplary call transmitter shown in exploded view in Fig. 4 and in the circuit schematic of Fig. 5. The same reference characters used in Figs. 4 and 5 to identify the various elements of the call transmitter are used in Figs. 7, 8 and 9 to identify corresponding elements. It is to be understood that the structural details shown in Figs. 7, 8 and 9 are merely a typical example of one way a call transmitter in accordance with the present invention may be constructed and that other structural details can be utilized with equal facility without departing from the scope of the present invention.

The base for the call transmitter is identified by the numeral 50 in Figs. 7, 8 and 9 and supports the cover or casing 51 in the well-known manner. Casing 51 is secured to base 50 by suitable screws as shown in Figs. 7 and 9. Fig. 8 shows a side elevation of the call transmitter taken along line 8—8 of Fig. 7 and shows a lower mounting plate 53 which is secured to base 50 by means of screws and is centrally supported by blocks 54 through which screws enter into base 50. Motor 1 is secured to motor base 60 by screws and motor base 60 is in turn secured to lower mounting plate 53 by screws as shown in Figs. 7, 8 and 9. Shaft 2 is connected to motor 1 by coupler 52 and a set-screw. Upright supports 55 and 56 are fastened to lower mounting plate 53 by suitable screws as shown. These upright supports have a bearing hole through which shaft 2 extends. Shaft 2 extends to and is connected to the rotating primary winding 18 of coupling coil 17 as shown in Fig. 8 and in greater detail in Fig. 10. The stationary secondary winding 19 of rotating coupling coil 17 and coupling coil 20 are supported by support 59 which is secured to lower mounting plate 53 by means of screws. Cap plate 78 is secured to support 59 by screws as shown in Figs. 8 and 10 and permits the removal of the stationary secondary winding 19 and coupling coil 20 from the assembled rotating coupling transformer 17. Shaft 2 is centrally supported at two locations in addition to the support given by upright supports 55 and 56 by bearing supports 57 and 58 which are secured to lower mounting plate 53. Rotating arms 12ST, 12SY, 12TH, 12H, 12T and 12U are shown secured to shaft 2 by setscrews. Mounted on each of these rotating arms are the sweeper coils 11ST, 11SY, 11TH, 11H, 11T and 11U, respectively. Upper mounting plate 61 is secured to upright supports 55 and 56 by screws as shown in Fig. 8. Between upper mounting plate 61 and lower mounting plate 53 the stationary coils are supported in the manner shown in Fig. 8. Stationary coil 10STY which is utilized to produce the start and synchronizing signals described hereinbefore is supported between upper mounting plate 61 and lower mounting plate 53 by brackets 62 and 63, respectively, which are extensions of and an integral part of shield supports 64 and 65, respectively. Shield supports 64 and 65, as well as brackets 62 and 63 which are integral parts thereof, are made of a nonconducting material such as plastic and are secured to upper mounting plate 61 and lower mounting plate 53, respectively, by screws as shown in Fig. 8.

Shield 16, which is shown in Fig. 8 interposed between sweeper coil 11ST and stationary coil 10STY and which is utilized in the production of the start signal, is secured to an upper shield support 64 and a lower shield support 65 by machine screws. Similarly, shield 15, which is shown in Fig. 8 interposed between sweeper coil 11SY and stationary coil 10STY and which is utilized in the production of the synchronizing signal, is secured to an upper shield support 64 and a lower shield support 65 by machine screws. As described hereinbefore, the start signal and synchronizing signal remain unchanged and, therefore, no provision is made for moving either shield 15 or shield 16 from their original position.

Coil 10TH, which is utilized in the production of coded signals for the thousands and hundreds digits of a called designation, is supported between upper mounting plate 61 and lower mounting plate 53 by upper coil support 66 and lower coil support 67, respectively. Upper coil support 66 and lower coil support 67 are also made of a nonconducting material and are secured to upper mounting plate 61 and lower mounting plate 53, respectively, by suitable machine screws. In a similar fashion, stationary coil 10TU, which is utilized in the production of coded signals representing the tens and units digits of a called designation, are supported between upper mounting plate 61 and lower mounting plate 53 by upper coil support 66 and lower coil support 67.

As described hereinbefore, the digit code shields which are utilized to produce two-out-of-five coded signals representing the various digits of a called designation are settable to any one of ten positions. Therefore, shield 14TH which is utilized in the production of the two-out-of-five coded signals to represent the thousands digit of the called designation is mounted on slidable shield supports. As shown in Fig. 8, shield 14TH is mounted between upper shield support 68TH and lower shield support 69TH by suitable screws. Key member 70TH which extends through slot 71TH in upper mounting plate 61 is secured to upper shield support 68th. Lower shield support 69TH has an extension 72th which extends through slot 73TH in lower mounting plate 53. Slot 71TH in upper mounting plate 61 and slot 73TH in lower mounting plate 53 can be more clearly seen in Fig. 9. Key member 70TH extending through slot 71TH and the extension 72TH of lower shield support 69TH extending through slot 73TH provide a means for guiding shield 14TH as it is moved to any one of its ten positions between sweeper coil 11TH and stationary coil 10TH. Secured to key member 70TH is an indicator 74TH and a positioning spring 75TH. Positioning spring 75TH has a detent which engages the teeth of ratchet member 76TH which is secured to upper mounting plate 61. Ratchet member 76TH has ten teeth or notches which correspond to the ten positions to which shield 14TH may be moved. The detent of positioning spring 75TH in engaging the teeth of ratchet member 76TH prevents shield 14TH from moving from a position to which it has been set until the operator changes the position. To move shield 14TH from one position to another desired position, key member 70TH which extends through slot 71TH may be grasped and by applying a force to this key member, shield 14TH, upper shield support 68th and lower shield support 69TH will move as a unit sliding in slot 71TH in upper mounting plate 61 and slot 73TH in lower mounting plate 53. As shield 14TH is moved from its position 1 tq its position 0, the slot in shield 14TH formed by the centrally located windows therein will pass over shaft 2. This slot corresponds to slot 3 in shield 14 shown in Fig. 3. Secured on casing 51 and adjacent to key member 70TH is an indicator plate 77TH which is graduated with the numerals 1 through 0. As key member 70TH is moved from position to position, indicator 74TH will point to the position to which shield 14TH is set.

Each of the other shields 14H, 14T and 14U is similarly secured in a slidable fashion between its corresponding stationary coil and sweeper coil to upper mounting plate 61 and lower mounting plate 53 and each has the identical mechanical details as above described in connection with shield 14TH. Each of these details has the same numeral designation as those described above in connection with shield 14TH and has a suffix letter which corresponds to the suffix letter of the shield. For example, shield 14H has key member 70H and positioning spring 75H.

Fig. 7 is an end view of the call transmitter taken along line 7—7 of Fig. 8 and shows the relative position of the rotating arms and associated sweeper coils with respect to the shields and stationary coils. The manner in which the detent of positioning spring 75TH engages the teeth of ratchet member 76TH is clearly shown in Fig. 7. Shield 16, which is utilized in the generation of the start signal, is shown with a portion being broken away to show shield 15. Shield 14TH, slidably mounted between upper mounting plate 61 and lower mounting plate 53 on upper shield support 68TH and lower shield support 69TH, respectively, is shown in its position 1. Rotating coupling transformer 17 is shown in dotted outline form on shaft 2. Stationary coil 10STY is shown in dotted outline form behind shield 16 and brackets 62 and 63 which are integral parts of upper shield support 64 and lower shield support 65, respectively, are shown in dotted form.

Fig. 9 is a top view of the call transmitter taken along line 9—9 of Fig. 8 and shows motor 1 with shaft 2 and rotating coupling transformer 17. Upper mounting plate 61 is partially broken in Fig. 9 so as to show stationary coil 10STY secured to upper shield support 64 along with shields 16 and 15. Upper shield supports 68TH, 68H, 68T and 68U are shown in Fig. 9 along with key members 70TH, 70H, 70T and 70U which are associated, respectively, with shields 14TH, 14H, 14T and 14U. Ratchet members 76TH, 76H, 76T and 76U are clearly shown mounted on upper mounting plate 61. Indicator plates 77TH, 77H, 77T and 77U which are mounted on casing 51 of the call transmitter, are shown in dotted outline form in Fig. 9 to indicate their relative positions with respect to indicators 74TH, 74H, 74T and 74U, respectively.

To preset the call transmitter shown in Figs. 7, 8 and 9 to enable it to transmit the exemplary call designation 2405, key member 70TH shown in Fig. 9 will be moved so that indicator 74TH is pointing to the numeral 2 on indicator plate 77TH, thus presetting shield 14TH to produce two-out-of-five coded signals for the thousands digit 2. Similarly, key member 70H shown in Fig. 9 will be moved so that indicator 74H is pointing to the numeral 4 on indicator plate 77H, thus presetting shield 14H to produce two-out-of-five coded signals for the hundreds digit 4. In like manner, key members 70T and 70U will be moved so that indicators 74T and 74U will point to the numerals 0 and 5, respectively, on their associated indicator plates. In this manner shield 14T is positioned to produce two-out-of-five coded signals to represent the tens digit 0 and shield 14U is positioned to produce two-out-of-five coded signals to represent the units digit 5. When motor 1, shown in Fig. 9 and the oscillator circuit shown in Figs. 5 and 6 are energized in the manner described hereinbefore, coded signals will be generated to represent the start signal, the synchronizing signal and the digits 2, 4, 0 and 5, as previously described.

What is claimed is:

1. In a call transmitter, a stationary coil, a source of potential connected to said stationary coil, a movable coil, means for moving said movable coil past the end of said stationary coil closely adjacent thereto, means interposed between said stationary coil and said movable coil for controlling magnetic coupling therebetween at predetermined times as said movable coil moves past said stationary coil and means responsive to said magnetic coupling for producing a plurality of signal pulses.

2. In a call transmitter, a stationary coil, a source of voltage connected to said stationary coil, a movable coil, means for moving said movable coil past the end of said stationary coil closely adjacent thereto, a shield of conducting material interposed between said stationary coil and said movable coil, said shield having a plurality of windows at predetermined locations therein through which voltage is induced into said movable coil from said stationary coil as said movable coil moves past said stationary coil and means responsive to the voltage induced in said movable coil for generating signal pulses.

3. In a call transmitter, a stationary coil, a source of alternating-current voltage, a scanning coil, means for rotating said scanning coil past the end of said stationary coil closely adjacent thereto, a shield of conducting material interposed between said stationary coil and said scanning coil settable to any one of a plurality of positions therebetween, said shield having a plurality of apertures arranged in a predetermined pattern at each of said positions to which said shield is settable and through which magnetic coupling will exist between said stationary coil and said scanning coil as said scanning coil traverses the end of said stationary coil, means for inducing a plurality of alternating-current impulses in said scanning coil and means responsive to said induced alternating-current impulses in said scanning coil for producing corresponding coded signal pulses.

4. The combination of claim 3 in which said means responsive to said induced alternating-current impulses in said scanning coil comprises a resonant circuit, means coupling said scanning coil to said resonant circuit whereby the alternating-current impulses induced in said scanning coil excite oscillations in said resonant circuit and means responsive to said oscillations in said resonant circuit for producing coded signal impulses.

5. In a call transmitter, a transistor having an emitter electrode, a collector electrode and a base electrode, an oscillator circuit connected to the electrodes of said transistor including a resonant circuit connected to the base electrode, said resonant circuit comprising a stationary coil connected in parallel with a capacitance, a scanner coil, rotating means for rotating said scanner coil past the end of said stationary coil closely adjacent thereto, a shield of conducting material interposed between said stationary coil and said scanner coil settable to any one of a plurality of positions therebetween, said shield having a plurality of openings located in a codewise fashion at each of said positions to which said shield is settable, said openings in said shield providing means permitting magnetic coupling between said stationary coil and said scanner coil at the position to which said shield is set, means for setting said shield between said stationary coil and said scanner coil to a predetermined desired position, energizing means for energizing said oscillator circuit to maintain oscillations in said stationary coil, means including said rotating means for inducing a plurality of alternating-current voltage impulses of predetermined duration and predetermined time relation in said scanner coil and means responsive to the plurality of induced alternating-current voltage pulses in said scanner coil for producing a corresponding plurality of direct-current coded signal pulses.

6. The combination of claim 5 in combination with a talking circuit comprising a transmitter and a receiver, unilateral conducting devices controlled by said energizing means for isolating said talking circuit from said oscillator circuit when said oscillator circuit is energized, means including said unilateral conducting device and controlled by said energizing means for energizing said talking circuit and further unilateral conducting devices controlled by said last-mentioned means for isolating said oscillator circuit from said talking circuit when said talking circuit is energized.

7. In a call transmitter, a stationary coil, a source of potential connected to said stationary coil, a motor, a shaft connected to said motor and rotated thereby, an arm mounted on said shaft, a sweeper coil mounted on said arm and adapted to sweep past said stationary coil as said motor rotates said shaft, selecting means interposed between said stationary coil and said sweeper coil for controlling magnetic coupling therebetween as said sweeper coil moves past said stationary coil, a rotating winding mounted on said shaft and adapted to rotate therewith, a resonant circuit, means including said selecting means for inducing a plurality of alternating-current pulses having predetermined duration and time relation into said sweeper coil, means for coupling said alternating-current pulses induced in said sweeper coil to said rotating winding, means for inducing said alternating-current pulses induced in said rotating winding into said resonant circuit to excite oscillations therein, means responsive to said oscillations in said resonant circuit for producing coded signal pulses.

8. The combination of claim 7 wherein said rotating winding mounted on said shaft and adapted to rotate therewith comprises the primary winding of a rotating coupling transformer and wherein said resonant circuit comprises a capacitance and inductance connected in parallel, said inductance being the stationary secondary winding of said rotating coupling transformer.

9. The combination of claim 8 wherein said means responsive to said oscillations in said resonant circuit for producing coded signal pulses comprises a coupling coil wound on the same core as the stationary secondary winding of said rotating coupling transformer, a rectifying means connected to said coupling coil for rectifying the oscillations induced therein from said stationary secondary winding and a filter condenser.

10. In a call transmitter, a motor, a shaft connected to said motor and driven thereby, a transistor having an emitter electrode, a collector electrode and a base electrode, an oscillator circuit connected to the electrodes of said transistor including a resonant circuit connected to the base electrode, said resonant circuit comprising a stationary coil connected in parallel with a capacitance, a sweeper coil mounted on said shaft and adapted to rotate about said shaft past the end of said stationary coil closely adjacent thereto, selecting means interposed between said stationary coil and said sweeper coil for controlling magnetic coupling therebetween as said sweeper coil moves past said stationary coil, energizing means for simultaneously energizing said oscillator circuit and said motor to maintain oscillations in said stationary coil and to drive said motor respectively, means controlled by said selecting means for inducing groups of oscillations at predetermined times and of predetermined duration in said sweeper coil, a second resonant circuit, means coupling the groups of oscillations induced in said sweeper coil to said second resonant circuit to excite corresponding groups of oscillations therein and means responsive to the groups of oscillations in said second resonant circuit for producing groups of direct-current signal pulses.

11. In a call transmitter, a plurality of stationary coils, a source of potential connected to said stationary coils, a plurality of movable coils associated with said stationary coils, means for sequentially moving said movable coils past the ends of their associated stationary coils, means for sequentially inducing a plurality of voltage pulses of predetermined duration and at predetermined times from said stationary coils into said movable coils and means responsive to the induced voltage pulses in said movable coils for producing a corresponding plurality of signal pulses.

12. In a call transmitter, a plurality of stationary coils, a source of alternating-current voltage, a plurality of scanner coils connected in series associated with said stationary coils, means for successively rotating said scanner coils past the ends of their associated stationary coils closely adjacent thereto, a plurality of shields of conducting material each interposed between a different one of said scanner coils and its associated stationary coil and each being settable to any one of a plurality of positions therebetween, each of said shields having a plurality of windows therein arranged in a predetermined pattern at each of said positions to which it is settable and through which magnetic coupling will exist from the stationary coil to the scanner coil between which it is interposed as said scanner coil traverses the end of said stationary coil, means for sequentially inducing a plurality of alternating-current impulses of predetermined duration and time relation from said stationary coils through the windows in said shields into said scanner coils and means responsive to said induced alternating-current impulses for producing a corresponding plurality of code signal pulses.

13. In a call transmitter, a transistor having an emitter electrode, a collector electrode and a base electrode, an oscillator circuit connected to the electrodes of said transistor including a resonant circuit connected to the base electrode, said resonant circuit comprising an inductance and a capacitance in parallel, said inductance comprising a series of stationary coils, a plurality of scanner coils connected in series and associated with said stationary coils, rotating means for sequentially rotating each of said scanner coils past the end of its associated stationary coil closely adjacent thereto, a plurality of shields of conducting material each interposed between a different one of said scanner coils and its associated stationary coil, each of said shields being individually settable to any one of a plurality of positions between its associated stationary coil and scanner coil, each of said shields having a plurality of slots therein located in a coded fashion at each of said positions to which it is settable, said slots in said shields providing means for magnetically coupling the scanner coil and its associated stationary coil between which each of said shields is interposed, means for independently setting each of said shields to a predetermined desired position, means for energizing said oscillator circuit to maintain oscillations in said stationary coils, means including said rotating means for sequentially inducing a plurality of alternating-current voltage pulses of predetermined duration and at predetermined times through the slots in said shields from said stationary coils into said scanner coils and means responsive to the plurality of induced alternating-current voltage pulses in said scanner coils for producing a corresponding plurality of direct-current signal code pulses.

14. In a call transmitter, a motor, a shaft connected to said motor and driven thereby, a transistor having an emitter electrode, a collector electrode and a base electrode, an oscillator circuit connected to the electrodes of said transistor including a resonant circuit connected to the base electrode, said resonant circuit comprising an inductance and a capacitance connected in parallel, said inductance comprising a plurality of stationary coils connected in series, a plurality of arms mounted on said shaft and separated from one another both axially and radially, a plurality of sweeper coils associated with said stationary coils each being mounted on one of said arms and each being adapted to sweep past its associated stationary coil as said motor rotates said shaft, a plurality of shields of conducting material each interposed between a different one of said sweeper coils and its associated stationary coil, each of said shields being individually settable to any one of a plurality of positions between its associated stationary and sweeper coils, each of said shields having a plurality of windows therein located in code fashion at each of said positions to which it is settable, said windows in said shields providing means for permitting magnetic coupling between the sweeper coil and its associated stationary coil between which each of said shields is interposed, means for independently setting each of said shields to a predetermined desired position, a rotating coupling transformer comprising a rotating primary winding mounted on said shaft and adapted to rotate therewith and a stationary secondary winding, a capacitance connected in parallel with said stationary secondary winding to form a second resonant circuit, means for simultaneously energizing said oscillator circuit and said motor to maintain oscillations in said stationary coils and to drive said motor respectively, means including said shields and said oscillator circuit for inducing a plurality of alternating-current voltage pulses of predetermined duration and time relation into said sweeper coils, means coupling said induced alternating-current voltage pulses in said sweeper coils to said rotating primary winding of said coupling transformer, means including said coupling transformer for inducing a corresponding plurality of alternating-current voltage pulses from said rotating primary winding into said second resonant circuit to excite a corresponding plurality of groups of oscillations therein and means responsive to the plurality of groups of oscillations in said second resonant circuit for producing a corresponding plurality of direct-current code signal impulses.

15. In a call transmitter, a talking circuit comprising a transmitter and a receiver, a motor, a shaft connected to said motor and driven thereby, a transistor having an emitter electrode, a collector electrode and a base electrode, an oscillator circuit connected to the electrodes of said transistor including a resonant circuit connected to the base electrode, said resonant circuit comprising an inductance and a capacitance connected in parallel, said inductance comprising a plurality of stationary coils connected in series, a plurality of arms mounted on said shaft and separated from one another both axially and radially, a plurality of sweeper coils associated with said stationary coils each being mounted on one of said arms and each being adapted to sweep past its associated stationary coil as said motor rotates said shaft, a plurality of shields of conducting material each interposed between a different one of said sweeper coils and its associated stationary coil, each of said shields being individually presettable to any one of a plurality of positions between its associated stationary and sweeper coils, each of said shields having a plurality of windows therein located in code fashion at each of said positions to which it is settable, said windows in said shields providing means for magnetically coupling the sweeper coil and its associated scanner coil between which each of said shields is interposed, means for independently setting each of said shields to a predetermined desired position, a rotating coupling transformer comprising a rotating primary winding mounted on said shaft and adapted to rotate therewith and a stationary secondary winding, a capacitance connected in parallel with said stationary secondary winding to form a second resonant circuit, a set of contacts, a first means controlled by said contacts for energizing said oscillator circuit to maintain oscillations in said stationary coils, a second means controlled by said contacts for energizing said motor to rotate said shaft, a third means controlled by said contacts for energizing said talking circuit, unilateral conducting devices controlled by said first means for isolating said talking circuit from said oscillator circuit when said oscillator circuit is energized, further unilateral conducting devices controlled by said third means for isolating said oscillator circuit from said talking circuit when said talking circuit is energized, means including said shields and said oscillator circuit for sequentially inducing a plurality of alternating-current voltage pulses of predetermined duration and time relation into said sweeper coils, means coupling said induced alternating-current voltage pulses in said sweeper coils to said rotating primary winding of said coupling transformer, means including said coupling transformer for inducing a corresponding plurality of alternating-current voltage pulses from said rotating primary winding into said second resonant circuit to excite a corresponding plurality of groups of oscillations therein, a coupling coil magnetically coupled with said stationary winding of said coupling transformer, rectifying means, means including said coupling coil for applying said plurality of groups of oscillations in said second resonant circuit to said rectifying means whereby said groups of oscillations are rectified and a filter means connected to said rectifying means for filtering said rectified pulses.

References Cited in the file of this patent

UNITED STATES PATENTS

| | | |
|---|---|---|
| 1,289,574 | Tedeschi et al. | Dec. 31, 1918 |
| 2,533,326 | Putt | Dec. 12, 1950 |
| 2,594,325 | Lovell | Apr. 29, 1952 |
| 2,724,067 | Herrick | Nov. 15, 1955 |
| 2,799,730 | Lovell et al. | July 16, 1957 |